(12) United States Patent
Hall et al.

(10) Patent No.: US 10,161,365 B2
(45) Date of Patent: Dec. 25, 2018

(54) EXPANSION SHEAR PIN FOR USE WITH THREAD-FORMING SCREW

(71) Applicant: Ford Global Technologies, LLC, Dearborn, MI (US)

(72) Inventors: Brent A. Hall, Grand Blanc, MI (US); Christopher William Newman, Farmington Hills, MI (US); Katherine Jane Brewer, Belleville, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 375 days.

(21) Appl. No.: 14/873,487

(22) Filed: Oct. 2, 2015

(65) Prior Publication Data
US 2017/0096976 A1    Apr. 6, 2017

(51) Int. Cl.
*F02M 35/10*    (2006.01)
*F16B 31/00*    (2006.01)
*F16B 35/00*    (2006.01)
*F16B 19/02*    (2006.01)
*F16B 5/02*    (2006.01)
*F16B 25/00*    (2006.01)

(52) U.S. Cl.
CPC .............. *F02M 35/10354* (2013.01); *F02M 35/10367* (2013.01); *F16B 19/02* (2013.01); *F16B 35/002* (2013.01); *F16B 5/02* (2013.01); *F16B 25/0021* (2013.01); *F16B 31/00* (2013.01)

(58) Field of Classification Search
CPC ........ F02M 35/10354; F02M 35/10367; F16B 35/002; F16B 31/00
See application file for complete search history.

(56) References Cited

U.S. PATENT DOCUMENTS

| | | |
|---|---|---|
| 8,262,331 B2 | 9/2012 | Toosky |
| 8,434,984 B2 | 5/2013 | Toosky |
| 8,529,177 B2 | 9/2013 | Toosky |
| 8,851,417 B2 * | 10/2014 | Sandy .................... B64D 27/26 244/54 |

\* cited by examiner

*Primary Examiner* — John C Hong
(74) *Attorney, Agent, or Firm* — LeClairRyan

(57) ABSTRACT

A coupling system for attaching a first part to a second part using a locator and expansion shear pin is disclosed. The first part has a first flange and may be a formed part, such as an intake manifold. The second part has a second flange and may be a component, such as a throttle body, for attachment to the first part. The component includes a fastener-passing bore having an inner diameter. The locator and expansion shear pin extends perpendicularly from the first flange. The pin includes an expansion wall extending beyond the surface of the flange. A fastener-receiving bore is formed concentrically in the pin relative to the wall. The wall is expandable from a first diameter to a second diameter. The first diameter is less than the inner diameter of the fastener-passing bore. The second diameter is at least equal to the inner diameter of the fastener-passing bore.

20 Claims, 2 Drawing Sheets

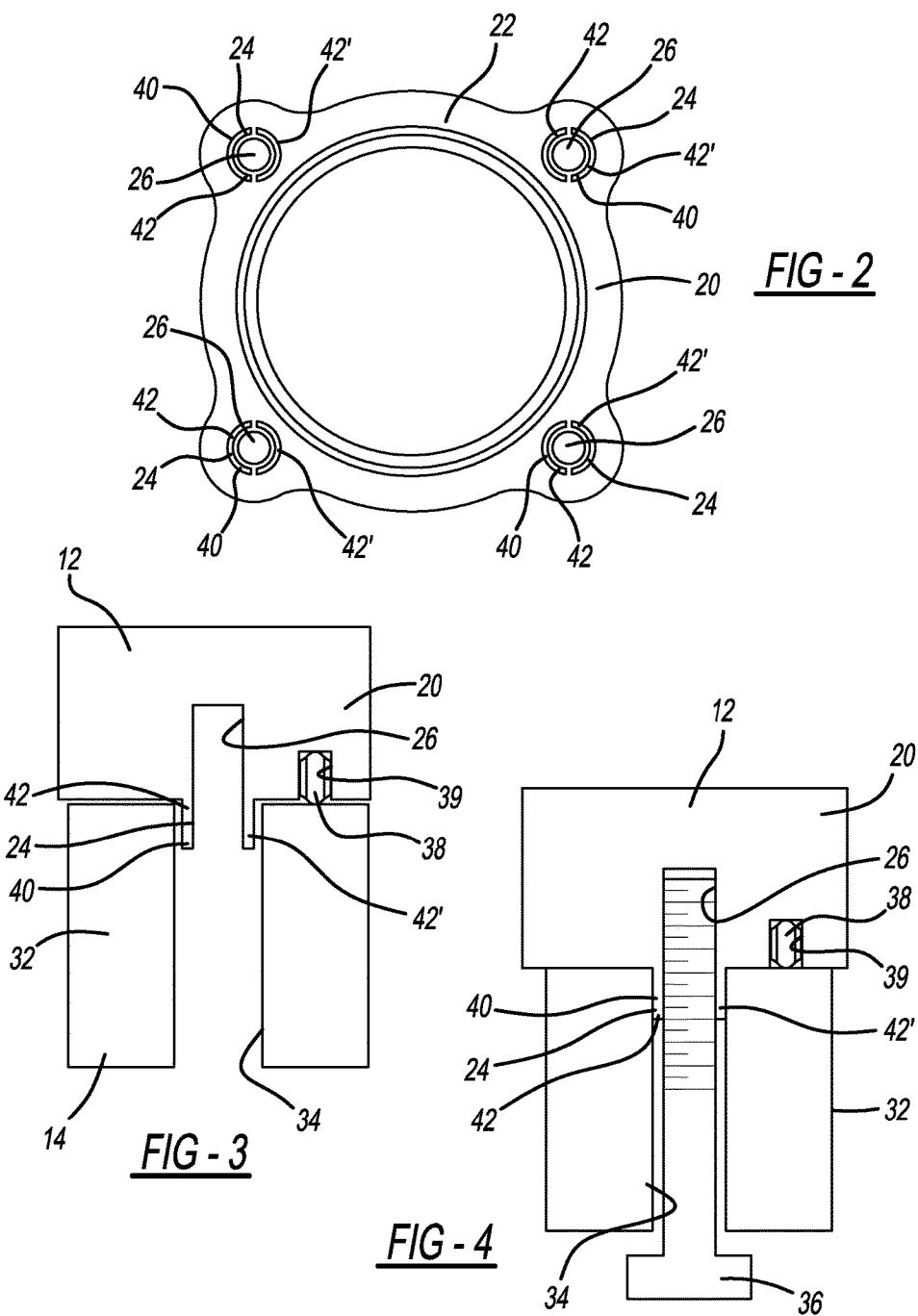

EXPANSION SHEAR PIN FOR USE WITH THREAD-FORMING SCREW

TECHNICAL FIELD

The disclosed inventive concept relates generally to fasteners that incorporate thread-forming screws. More particularly, the disclosed inventive concept relates to a locator and expansion shear pin used with a thread forming screw. The locator and expansion shear pin limits shear motion once the clamp load has been degraded due to creep. The disclosed inventive concept has a wide array of uses, including for the attachment of components to molded components, such as intake manifolds on an internal combustion engine.

BACKGROUND OF THE INVENTION

The use of thread-forming screws for attachment of a component to a molded component offers both material and production cost advantages over free running fasteners since a free running fastener requires a metallic insert. By avoiding the need for an insert, the use of thread-forming screws for component attachment provides additional advantages due to cycle time reduction and lower tooling costs.

The mechanism that allows the forming of the threads around the fastener is the local melting and reforming of the female threads around the male thread. Due to creep of the plastic with exposure to temperature, there is intrinsic relaxation of the material, resulting in reduced bolt stretch and consequential loss of clamp load at the joint.

An example of an assembly requiring fasteners is where certain components are attached to the intake manifold of an internal combustion engine. Components commonly associated with the intake manifold include the throttle body, the mass air flow sensor, various ducts and a fuel rail. Some of these components, such as the automotive throttle body have a flange for coupling with a flange located on an inlet side of the intake manifold. It is very common for today's throttle body to be composed of a metal such as aluminum, while it is very common for the modern intake manifold to be injection molded of a polymerized material.

Efforts have been made in the past to use thread-forming screws to attach one of these components, such as the throttle body, to the molded intake manifold. The use of thread-forming screws to attach the throttle body to the manifold presents certain challenges as this clamp load is lost, since it utilizes a face seal. In order to mitigate abrasion of the seal due to relative motion between the intake and the throttle body faces, shear pins are often used.

A further challenge is created when two parts are to be connected despite manufacturing tolerances. Typically the fastener-passing bores of the flange being fastened are slightly oversized. As a result, when, for example, a throttle body is attached to an intake manifold, the inside diameters of the throttle body and the intake manifold may be slightly offset because the fastener is loose relative to the oversized fastener-passing bore. As a result, as air travels from the throttle body into intake manifold, the mismatch may lead to eddies being formed and may lead to a whistling sound that is noticeable to the operator of the vehicle. Such a mismatch also slightly negatively impacts the maximum amount of flow to the engine, i.e., slightly hurting peak engine performance.

Thus, while presenting a partial solution to the challenges faced in the use of thread-forming screws, the shear pins must be sized and their tolerances adjusted such that assembly resulting in a proper alignment is always possible. However, this approach limits the effectiveness of the use of shear pins in preventing relative motion. Some designs exist that utilize split pins or crush features on the edge of the pins to allow a tighter fit into the fastener-passing bore. However, this approach raises the concern of how much material can be deformed or moved without causing interference in the joint seating or in the gasket sealing function.

Thus known approaches to attaching a component to a molded part are undesirable and impractical. Accordingly, an improved arrangement for attaching a component to a molded part remains wanting.

SUMMARY OF THE INVENTION

The disclosed inventive concept overcomes the problems associated with the use of thread-forming fasteners to attach a component to a molded part. Particularly, the disclosed inventive concept is a coupling system that includes a first flange on the formed part, a second flange on the component for connection to the first flange of the formed part, a fastener for attaching the component to the formed part, a locator and expansion shear pin extending outwardly from the first flange, and a fastener-passing bore formed through the second flange.

The first flange includes an attachment face. The locator and expansion shear pin includes an expandable wall that extends perpendicularly from the attachment face of the first flange. A fastener-receiving bore is formed concentrically in the pin relative to the wall. The wall is expandable from a first diameter to a second diameter. The fastener-passing bore includes an inner diameter. The first diameter is less than the inner diameter of the fastener-passing bore. The second diameter is at least equal to the inner diameter of the fastener-passing bore.

The wall may be split in one or more places to allow maximum expansion. The wall is preferably integrally formed with the molded component. The fastener may be a self-threading fastener.

Upon initial assembly, the wall of the locator and expansion pin of the molded part is fitted into the fastener-passing bore of the second flange of the component. Because the outer diameter of the locator and expansion pin is less than the inner diameter of the fastener-passing bore, the fit is achieved without interference, thus having no impact on the joint being formed. When the self-threading fastener is inserted through the fastener-passing bore of the second flange and into the fastener-receiving bore of the locator and expansion shear pin, the wall of the pin expands into the fastener-passing bore, thus providing a secure interference fit.

According to the disclosed inventive concept, at least two sets of locator and expansion shear pins are provided on the flange of the molded part, such as an intake manifold, which couple with fastener-passing bores provided on the flange of the component being attached, such as a throttle body. In addition, and in this example, fastener-passing bores are provided on the throttle body flange and threaded inserts are provided on the flange of the intake manifold. The locator pins are coupled with fastener-passing bores prior to inserting the thread-forming fastener through the fastener-passing bores to engage with the locator and expansion shear pins. By providing the locator and expansion shear pins, the two flanges are held in a desired orientation so that the ducts of the two flanges are properly aligned to substantially eliminate a step at the interface.

The above advantages and other advantages and features will be readily apparent from the following detailed description of the preferred embodiments when taken in connection with the accompanying drawings.

BRIEF DESCRIPTION OF THE DRAWINGS

For a more complete understanding of this invention, reference should now be made to the embodiments illustrated in greater detail in the accompanying drawings and described below by way of examples of the invention wherein:

FIG. 2 is a view of the face of the intake manifold flange illustrating the locator and expansion shear pins extending outward from the face, the pins including walls that are concentrically formed around a fastener-receiving bore;

FIG. 3 is a sectional view of the intake manifold flange and the throttle body preliminarily connected thereto in which the locator and expansion shear pin is in position within the fastener-passing bore of the throttle body; and FIG. 4 is a view similar to that of FIG. 3 except that a thread-forming fastener has been inserted through the fastener-passing bore formed in the throttle body and into the fastener-receiving bore formed in the intake manifold, thereby expanding the wall of the pin to create an interference fit within the fastener-passing bore of the throttle body.

DETAILED DESCRIPTION OF THE PREFERRED EMBODIMENT

Figure 1:
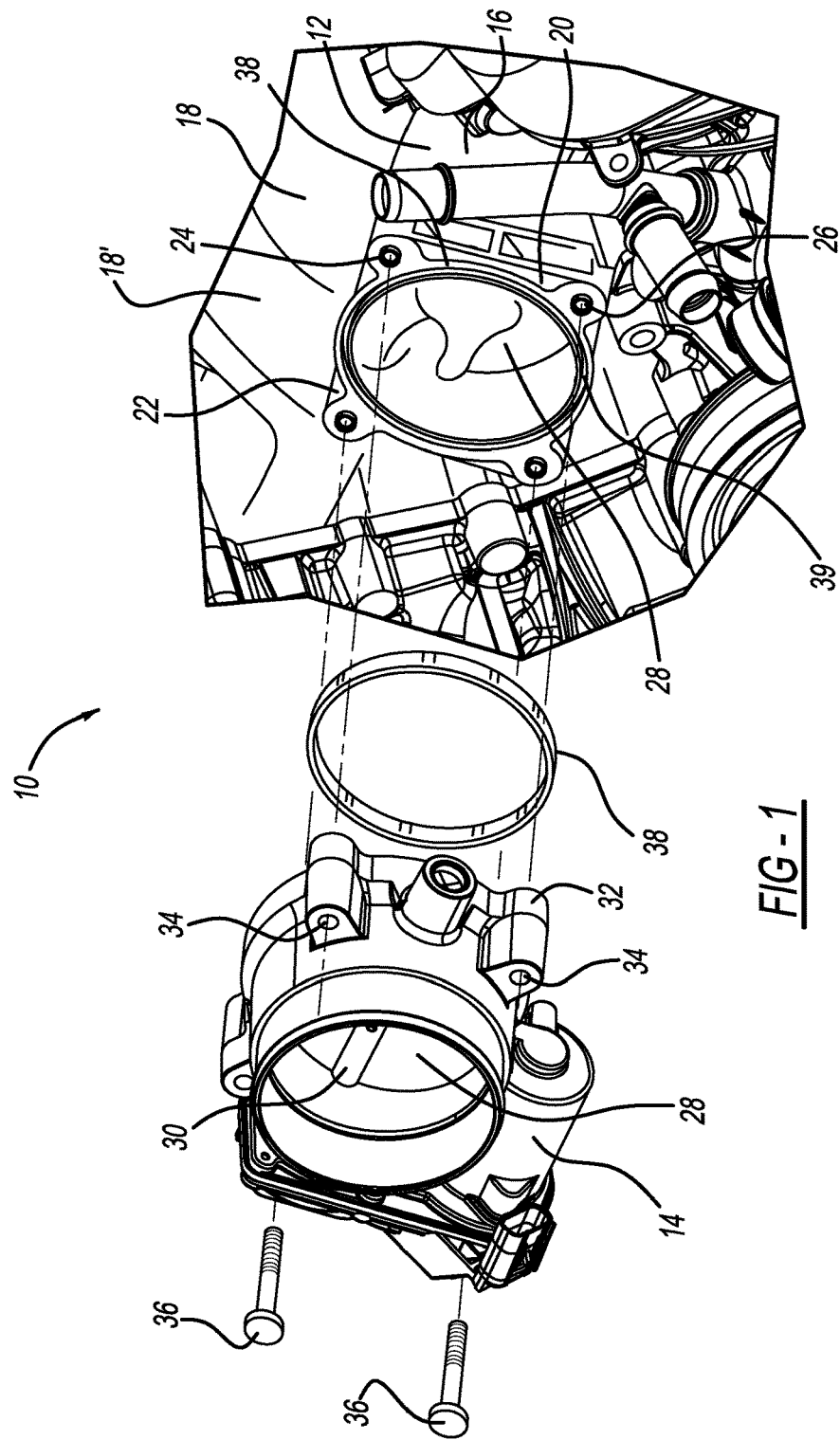
FIG. 1 is a partially exploded perspective view of a throttle body and an intake manifold together with a gasket and thread-forming fasteners according to the disclosed inventive concept.

As those of ordinary skill in the art will understand, various features of the embodiments illustrated and described with reference to any one of the Figures may be combined with features illustrated in one or more other Figures to produce alternative embodiments that are not explicitly illustrated or described. The combinations of features illustrated provide representative embodiments for typical applications. However, various combinations and modifications of the features consistent with the teachings of the present disclosure may be desired for particular applications or implementations.

FIG. 1 illustrates a partially exploded view of an intake manifold assembly according to the disclosed inventive concept. The intake manifold assembly, generally illustrated as 10, includes an intake manifold 12 and an attached component which, in the illustration, is a throttle body 14. The intake manifold 12 may be of any configuration, although the intake manifold 12 illustrated in FIG. 1 includes a plenum 16 from which extend intake runners 18 and 18'. A greater or lesser number of runners may be fitted than the number illustrated.

It is to be understood that while an intake manifold 12 and a throttle body 14 are illustrated, the fastener arrangement of the disclosed inventive concept may be used with any component that is attached to a molded part. Accordingly, the illustrated intake manifold 12 and the throttle body 14 illustrated in the figures and discussed herein are exemplary but are not intended as being limiting. The molded part is preferably molded from a polymerized material, though it is possible that the molded part may be formed from a metal. In addition, the component being attached to the molded part is preferably formed from a metal, but may be formed from a polymerized material.

The intake manifold 12 includes an attachment flange 20. The attachment flange 20 includes an attachment face 22. A series of locator and expansion shear pins 24 extend from the attachment face 22 of the attachment flange 20. Preferably but not absolutely the locator and expansion shear pins 24 are integrally formed with the attachment flange 20 of the intake manifold 12. The locator and expansion shear pins 24 are concentrically formed around a fastener bore 26 formed in the attachment flange 20. As noted below, the outwardly extending wall of the locator and expansion shear pins 24 may be split into two or more portions, may have a single split, or may not be split at all.

The throttle body 14 includes a throttle plate 28 that rotates about a throttle plate rod 30. The throttle plate 28 may be mechanically actuated by the operator of the vehicle, although more typically the throttle plate 28 actuated electronically by, for example, a DC brush motor and geartrain (contained within the throttle body housing and cover) or other suitable actuation means.

The throttle body 14 includes a throttle body attachment flange 32 that couples to the attachment flange 20 of the intake manifold 12. Unthreaded fastener-passing bores 34 are formed in the throttle body attachment flange 32. While four fastener-passing bores 34 are formed through the throttle body attachment flange 32 for fitting to a like number of locator pins 24, a greater or lesser number of fastener-passing bore 34 may be provided. Furthermore, while four locator and expansion shear pins 24 are illustrated, it is to be understood that one or more of the pins may be a tight fitting pin rather than the illustrated locator and expansion type shown in the figures. It may be desired for a single locator and expansion shear pin 24 to be utilized with the rest of the pins being tight fitting pins. This would depend on the situation.

Thread-forming fasteners 36 are used to fasten the throttle body 14. The illustrated shape of the thread-forming fastener 36 shown in FIG. 1 is intended as being illustrative only and is not intended as being limiting. It was noted above that the molded part is preferably formed from a polymerized material, although other materials, such as metal, may be used. In the event that a material other than a plastic is used for the molded part, the thread-forming fastener would not necessarily be used.

A sealing member such as a gasket 38 is fitted between the throttle body attachment flange 32 and the attachment flange 20 of the intake manifold 12. The gasket 38 may be made of any suitable sealing material. A gasket-receiving groove 39 is formed on the attachment face 22 of the attachment flange 20 of the intake manifold 12.

FIG. 2 illustrates a face of the attachment flange 20 of the intake manifold 12. In this figure, the construction of the locator and expansion shear pins 24 each having a fastener bore 26 is shown in detail. Each locator and expansion shear pin 24 includes a wall 40 that is concentrically formed around the fastener bore 26 and extends outwardly from the attachment face 22 of the attachment flange 20. While the shape of the wall is illustrated as being round, this illustration is not intended as being limiting as other shapes may be possible. For example, the wall 40 may include one or more additional features, such as crush rib features. The wall 40 may be continuous, may include a single axial slot, or may split into two wall portions 42 and 42' as illustrated.

In FIGS. 3 and 4, the attachment flange 20 of the intake manifold 12 is shown assembled with the throttle body attachment flange 32 of the throttle body 14. The gasket 38 is shown in FIGS. 3 and 4 in cross-section in the gasket-receiving groove 39. As illustrated, the attachment flange 32 of the throttle body 14 is held against the attachment flange 20 of the intake manifold 12, thus causing the gasket 38 to be compressed, thereby forming a fluid-tight seal between the intake manifold 12 and the throttle body 14.

As noted above, the wall 40 may be continuous or may include a single axial slot. It may also be split into the two wall portions 42 and 42' shown in FIGS. 3 and 4. The wall portions 42 and 42' as illustrated have blunt ends, but it is to be understood that the ends of the wall portions 42 and 42' may be tapered as well.

In FIG. 3, the locator and expansion shear pins 24 are partially inserted without interference into one of the fastener-passing bores 34 formed in the throttle body attachment flange 32. In this position, the wall 40 is provisionally fitted into the fastener-passing bore 34 as illustrated, leaving a slight gap between the wall of the fastener-passing bore 34 and the wall 40 of the locator and expansion shear pin 24. The provisional fit allows for proper alignment of the throttle body 14 to the intake manifold 12.

In FIG. 4, the thread-forming fastener 36 is shown fitted into the fastener-passing bore 34 and extending into the fastener bore 26 of the attachment flange 20 of the intake manifold 12. Insertion of the thread-forming fastener 36 into the locator and expansion shear pin 24 distorts the wall 40 thereby causing the wall portions 42 and 42' to deflect instead of forming threads. Accordingly, the wall portions 42 and 42' expand into the fastener-passing bore 34 such that a secure engagement between the wall 40 and the fastener-passing bore 34 is formed. As illustrated, the one or more splits of the wall 40 forming the wall portions 42 and 42' can maximize wall deformation once the thread-forming fastener 26 is in place.

The embodiments of the disclosed inventive concept overcome challenges faced by known methods of attaching a component to a formed part such as an intake manifold. The arrangement is efficient, reducing both matter cost and labor cost while assuring an effective connection.

The locator and expansion shear pin 24 of the disclosed inventive concept may be utilized to enable the attachment of other components that have previously been attached by free running fasteners due to component mass, temperature, use of face seal. An example of such a component is an EGR valve. Use of the locator and expansion shear pin 24 allows greater cost savings or cost avoidance since all inserts otherwise needed for self-threading fasteners can be deleted from a given formed part, such as an intake manifold or cam cover. This offers manufacturers reduced cycle time and facilities savings in delivering inserts to the component assembly line.

One skilled in the art will readily recognize from such discussion, and from the accompanying drawings and claims that various changes, modifications and variations can be made therein without departing from the true spirit and fair scope of the invention as defined by the following claims.

What is claimed is:

1. A throttle body-to-manifold coupling system comprising:
   a first flange on the manifold;
   a second flange on the throttle body;
   a fastener;
   a bore formed in said second flange, said bore having an inner diameter,
   a pin extending outwardly from said first flange and insertable into said bore, said pin being expandable from a first diameter to a second diameter, said first diameter being less than said inner diameter and said second diameter being at least equal to said inner diameter.

2. The coupling system of claim 1, wherein said first flange has a face and wherein said pin extends perpendicularly with respect to said face.

3. The coupling system of claim 2, wherein said pin is a locator and expansion shear pin having a fastener-receiving bore.

4. The coupling system of claim 3, wherein said pin includes an expandable wall extending above said face.

5. The coupling system of claim 4, wherein said wall is split.

6. The coupling system of claim 4, wherein said expandable wall is concentric with said fastener-receiving bore.

7. The coupling system of claim 5, wherein said expandable wall is integrally formed with said manifold.

8. The coupling system of claim 1, wherein said fastener is a self-threading fastener.

9. A system for attaching a component to a molded part comprising:
   a molded part flange;
   a component flange;
   a fastener;
   a bore having an inner diameter formed in said component flange; and
   a pin extending outwardly from said molded part flange and integrally formed therewith, said pin being insertable into said bore and having a wall expandable from a first diameter to a second diameter, said first diameter being less than said inner diameter and said second diameter being equal to said inner diameter.

10. The system of claim 9, wherein said first flange has a face and wherein said pin extends perpendicularly with respect to said face.

11. The system of claim 10, wherein said pin is a locator and expansion shear pin has a fastener-receiving bore.

12. The system of claim 11, wherein said wall extends above said face.

13. The system of claim 12, wherein said wall is split.

14. The system of claim 12, wherein said expandable wall is concentric with said bore.

15. The system of claim 9, wherein said fastener is a self-threading fastener.

16. A method for attaching a component having a component flange to a manifold having a manifold flange, the method comprising:
   forming an assembly system comprising a fastener and a locator and expansion shear pin integrally formed with the manifold flange, said locator and expansion shear pin having an expandable wall extending from the manifold flange, and a bore formed in the component flange;
   placing said wall within said bore; and
   inserting said fastener, whereby said expandable wall is movable within said bore when initially attached but is expanded into said bore after insertion of said fastener to restrict movement therein.

17. The method for attaching of claim 16, wherein said manifold flange includes an attachment face and wherein said locator and expansion shear pin has a long axis, said long axis being perpendicular to said face.

18. The method for attaching of claim 16, wherein said locator and expansion shear pin has a fastener-receiving bore.

19. The method for attaching of claim 16, wherein said wall is split.

20. The method for attaching of claim 16, wherein said locator and expansion shear pin includes a fastener-receiving bore, said fastener-receiving bore being concentric with said wall.

* * * * *